United States Patent
Song et al.

(10) Patent No.: US 7,899,964 B2
(45) Date of Patent: Mar. 1, 2011

(54) METHOD AND SYSTEM FOR PROVIDING UNIVERSAL PLUG AND PLAY RESOURCE SURROGATES

(75) Inventors: Yu Song, Pleasanton, CA (US); Doreen Cheng, San Jose, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 935 days.

(21) Appl. No.: 11/805,681

(22) Filed: May 23, 2007

(65) Prior Publication Data
US 2008/0016203 A1    Jan. 17, 2008

Related U.S. Application Data

(60) Provisional application No. 60/830,841, filed on Jul. 13, 2006.

(51) Int. Cl.
*G06F 13/00* (2006.01)
*G06F 15/177* (2006.01)

(52) U.S. Cl. .................. 710/104; 709/221; 709/224; 709/225

(58) Field of Classification Search .................. 710/104
See application file for complete search history.

(56) References Cited

U.S. PATENT DOCUMENTS

| | | | |
|---|---|---|---|
| 7,315,886 B1 * | 1/2008 | Meenan et al. | 709/219 |
| 2006/0075100 A1 * | 4/2006 | Stirbu | 709/225 |
| 2006/0129700 A1 * | 6/2006 | Bopardikar | 710/2 |
| 2007/0288632 A1 * | 12/2007 | Kanaparti et al. | 709/224 |

FOREIGN PATENT DOCUMENTS

| | | | |
|---|---|---|---|
| KR | 10-2005-0055449 A | | 6/2004 |
| KR | 10-2005-0055134 A | | 6/2005 |
| WO | WO 02/067357 A2 | | 8/2002 |
| WO | WO 2004/057822 A2 | | 7/2004 |

OTHER PUBLICATIONS

"Jini™ Technology Surrogate Architecture Specification"; Sun Microsystems Inc.; Jun. 26, 2006; all pages.*
Klamra et al.; "Design and Evaluation of Power Management Support for UPnP Devices"; Jun. 10, 2005; all pages.*
PCT International Search Report, PCT International Application No. PCT/KR2007/003284, dated Oct. 10, 2007.

* cited by examiner

*Primary Examiner*—Ryan M Stiglic
(74) *Attorney, Agent, or Firm*—Kenneth L. Sherman, Esq.; Michael Zarrabian, Esq.; Myers Andras Sherman & Zarrabian LLP (57) ABSTRACT

A method and system for providing services in a network including a control point and plural UPnP devices is provided. Surrogates are used to functionally replace the original UPnP device/service functionalities without new hardware or firmware/software updates. The surrogates enable proper operation in UPnP networks where devices that implement surrogates can coexist in the same network with UPnP devices that do not. This allows updating existing device functionalities without requiring new hardware or firmware/software updates.

39 Claims, 9 Drawing Sheets

METHOD AND SYSTEM FOR PROVIDING UNIVERSAL PLUG AND PLAY RESOURCE SURROGATES

RELATED APPLICATION

This application claims priority from U.S. Provisional Patent Application Ser. No. 60/830,841, filed Jul. 13, 2006, incorporated herein by reference.

FIELD OF THE INVENTION

The present invention relates to Universal Plug and Play (UPnP) resources and in particular, to updating UPnP resources such as devices and services.

BACKGROUND OF THE INVENTION

Universal Plug and Play (UPnP) is increasing in importance as a standard for private area networking (PAN) and local area networking (LAN) such as home networking. Simple Service Discovery Protocol (SSDP) is one of the key protocols that form the foundation of the UPnP standard. In the UPnP standard, SSDP is used by UPnP resources, such as devices and/or UPnP services, to advertise their availability in a network. When a UPnP device becomes available, it periodically multicasts "alive" message in the network to advertise its availability. Likewise, a UPnP service also advertises its presence in the network periodically in the same manner.

Enabling networked consumer electronics (CE) devices to work together collaboratively is the primary goal of the UPnP standard. CE devices range from sophisticated personal computers to single function devices such as a thermostat. The life span of CE devices can also range from less than a year to many years. Competitive forces in the CE industry drive the introduction of new services on CE devices on a frequent basis. The new services are usually introduced with new CE hardware and/or through firmware updates. However, the introduction of new hardware with enhanced services is not cost effective to the consumer because obtaining such new services requires purchasing new hardware, even though the consumer's existing hardware is still functional. In addition, the new hardware may not offer backward compatibility with the existing hardware. This incompatibility also occurs with the firmware updates. Further, if the updated services are "buggy", it is not easy, or sometimes it is impossible, for a consumer to revert back to the old services. There is, therefore, a need for a method and system that provides upgrades to UPnP devices and services without requiring changes to the device hardware/firmware.

BRIEF SUMMARY OF THE INVENTION

The present invention provides a method and system for providing services in a network including a control point and plural UPnP devices. In one embodiment, this is achieved using surrogates which can functionally replace the original UPnP devices/services functionalities without new hardware or firmware/software update. The surrogates enable proper operation in UPnP networks where devices that implement surrogates can coexist in the same network with UPnP devices that do not. This allows updating existing device functionalities without requiring new hardware or firmware/software updates.

These and other features, aspects and advantages of the present invention will become understood with reference to the following description, appended claims and accompanying figures.

DETAILED DESCRIPTION OF THE INVENTION

The UPnP specification does not enable upgrades to UPnP devices and/or services without changing device hardware, firmware and/or software. The present invention provides a method and system that allow updating existing device functionalities without requiring new hardware or firmware/software updates. In one embodiment, this is achieved using surrogates which can functionally replace (e.g., act for, substitute for, enhance, add new services to, reduce existing services from, revert service updates back to an earlier version) the original UPnP device/service functionalities without new hardware or firmware/software update. The surrogates enable proper operation in UPnP networks where devices that implement surrogates can coexist in the same network with UPnP devices that do not.

A surrogating resource (i.e., a surrogate resource) provides services on behalf of another resource (i.e., a surrogated resource). In the following description, three example implementations of surrogating UPnP resources according to the present invention are described, wherein each implementation provides a different solution to ensure proper inter-operations when surrogating resources coexist with legacy UPnP resources in the same network.

Figure 1:
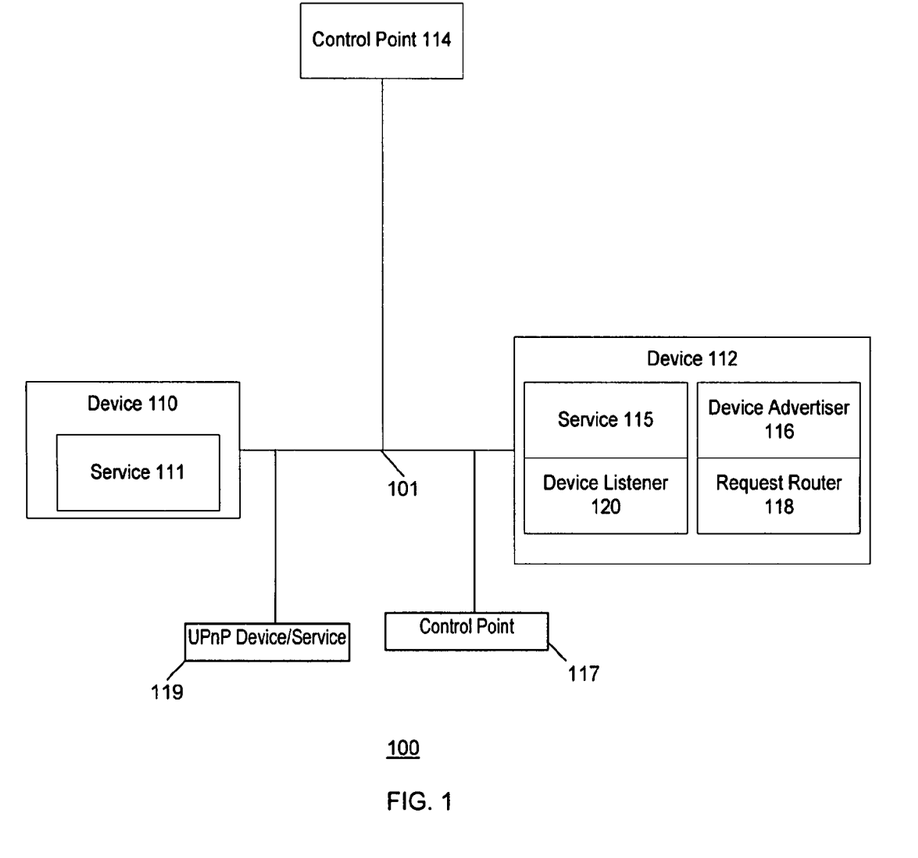
FIG. 1 shows a functional block diagram of a network implementing a surrogating process for resource access, according to an embodiment of the present invention.

A first implementation of a surrogating process according to the present invention enables both a surrogating UPnP resource and a surrogated UPnP resource to advertise themselves in the network. A new SSDP header is used to inform UPnP control points that the surrogating resource should be used instead of the surrogated resource. FIG. 1 shows a functional block diagram of an example network 100 such a local area network, as in a home network, that embodies said first implementation according to the present invention.

The network 100 includes at least one UPnP device (e.g., device 110), a surrogating UPnP device 112, and at least one UPnP control point (e.g., device 114). The UPnP devices 110, 112 and the control point 114 are connected via a LAN 101, such as Ethernet, WiFi, etc. The network 100 can further include another control point 117, and another UPnP device 119 that can be a surrogating device or a surrogated device. The UPnP device 110 provides a service 111 that can be invoked from the control point 114. The surrogating device 112 provides a UPnP service 115 which enhances the functionalities of the services provided by the surrogated device 110.

The surrogating device 112 includes a device listener (detector) 120, a device advertiser 116 and a request router 118. The device listener 120 listens on a UPnP multicast channel in the LAN 101, for any UPnP resource (device/service) advertisements and for requests from UPnP control points. The device advertiser 116 advertises the presence of a new device/service on behalf of the device it surrogates. The request router 118 redirects service requests from the control point 114 to either the service 111 in the device 110 or the service 115 in the device 112 depending upon the request.

A surrogating process includes three phases: a setup phase, a discovery phase and an invocation phase.

During the setup phase, the device 112 is configured to act as the surrogating device for the device 110 in order to add the new service 115, or update the service 111 to be the service 115. This setup phase comprises the following steps:
1. Installing the service 115, the device listener 120, the device advertiser 116 and the request router 118, on the device 112.
2. Optionally configuring the listener 120 to listen to the UPnP multicast channel for UPnP devices/services advertisements and requests from UPnP control points in the LAN.
3. Optionally configuring the advertiser 116 to advertise for the device 110 and the service 111, for example, by providing the advertiser 116 with the identities (Universally Unique Identifier (UUID)) of device 110 and the service 111.

The setup phase can continue as either of the following two different cases:
Case 1: Setting up the device 120 to be a surrogating device (i.e., surrogate) of the device 110 after the device 110 is already operating in the same UPnP network as the device 120; or
Case 2: Setting up the device 120 to be a surrogating device of the device 110 before the device 110 comes online in the same UPnP network as the device 120.

Figure 2:
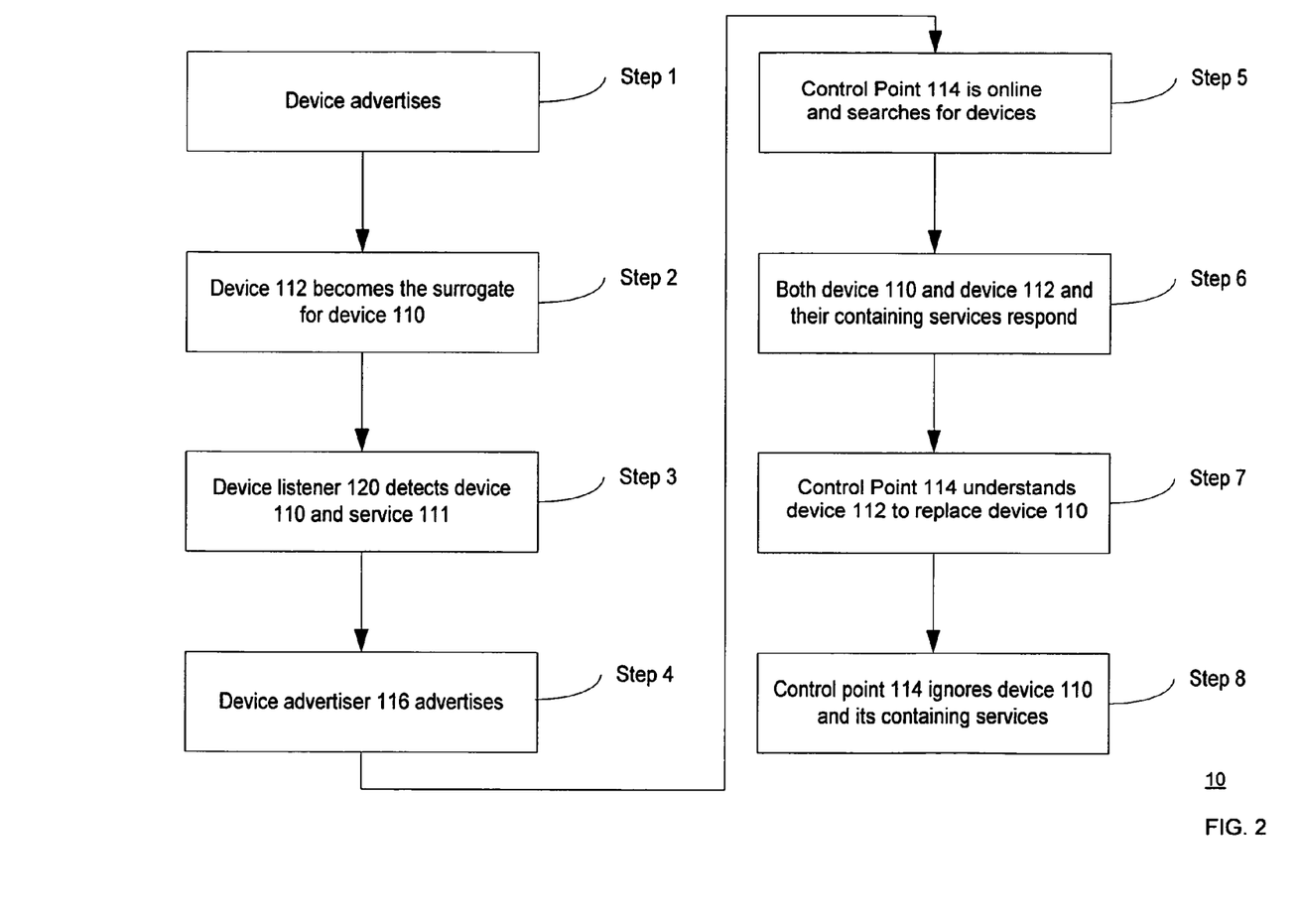
FIG. 2 shows a flowchart of the steps of a discovery phase of an example surrogating process, according to the present invention.

FIG. 2 shows a flowchart of the discovery phase 10 after a setup phase according to Case 1 above, wherein the discovery phase 10 includes the following steps:
1. If setup is according to Case 1 above, the device 110 advertises itself and the service 111, on the multicast channel using UPnP SSDP, and proceeds to step 3 below. If setup is according to Case 2 above, the device 120 does not advertise on behalf of the device 110 and proceeds to step 2 below.
2. At a later time, the device 110 comes online and advertises itself and the service 111, on the multicast channel using UPnP SSDP "alive" advertisements.
3. The device listener 120 detects the availability of the device 110 and the service 111 based on the SSDP advertisements.
4. The device advertiser 116 starts to advertise the availability of the surrogating device 112, the surrogated service 111 and the service 115. The surrogated service 111 is the same as the original service 111, but the address (e.g., the URL) of the surrogated service 111 points to the request router 118 in the surrogating device 112 instead of the surrogated device 110.

a. In the device 112 advertisement, the device advertiser 116 adds an additional replacement header, "REPLACE". The value of this header is the UUID of the device 110. This informs any control point that the device 112 is a functional replacement of the device 110.
b. In the service 111 advertisement, the device advertiser 116 adds an additional replacement header, "REPLACE". The value of this header is in the form of "UUID:service type:service version". The "UUID" is the UUID of the device 110. The "service type" and the "service version" are the service type and the service version of the service 111, respectively. This informs any control point that the service 111 of the device 112 functionally replaces the service 111 from the device 110.

5. At a later time, the control point 114 comes online and multicasts a UPnP "M-Search" request to discover any online devices on the LAN 101.
6. The device 110, the service 111, the device 112 and the service 115, all respond to the search request from the control point 114. In the response from the device 112 and in the response from the surrogated service 111, there is an additional header, "REPLACE". The value of this header is in the form of "UUID:service type:service version". The "UUID" is the UUID of the device 110. The "service type" and the "service version" are the service type and the service version of the service 111, respectively.

This informs any control point that the service 111 from the device 112 functionally replaces the service 111 from the device 110.

7. Based on the "REPLACE" headers in one or more of the responses, the control point 114 determines that the device 112 functionally replaces the device 110, and the service 115 functionally replaces the service 111.
8. The control point 114 ignores the responses from the device 110 and the service 111, and any advertisements from them. Instead, the control point 114 uses the responses from the surrogating device 112 and the surrogating service 115.

If the control point 114 is already operating in the UPnP network before the surrogating device 112 and the surrogating service 115 go online, then the above steps 5 to 8 are changed to: (i) The control point 114 listens on the multicast channel and receives SSDP advertisements from any devices, and (ii) if the control point 114 supports a surrogating process, the control point 114 ignores the advertisements from the device 110 and the service 111, and instead uses the advertisements from the device 112 and the service 115; otherwise, the control point 114 ignores the "REPLACE" header and operates according to the UPnP specification.

Figure 3:
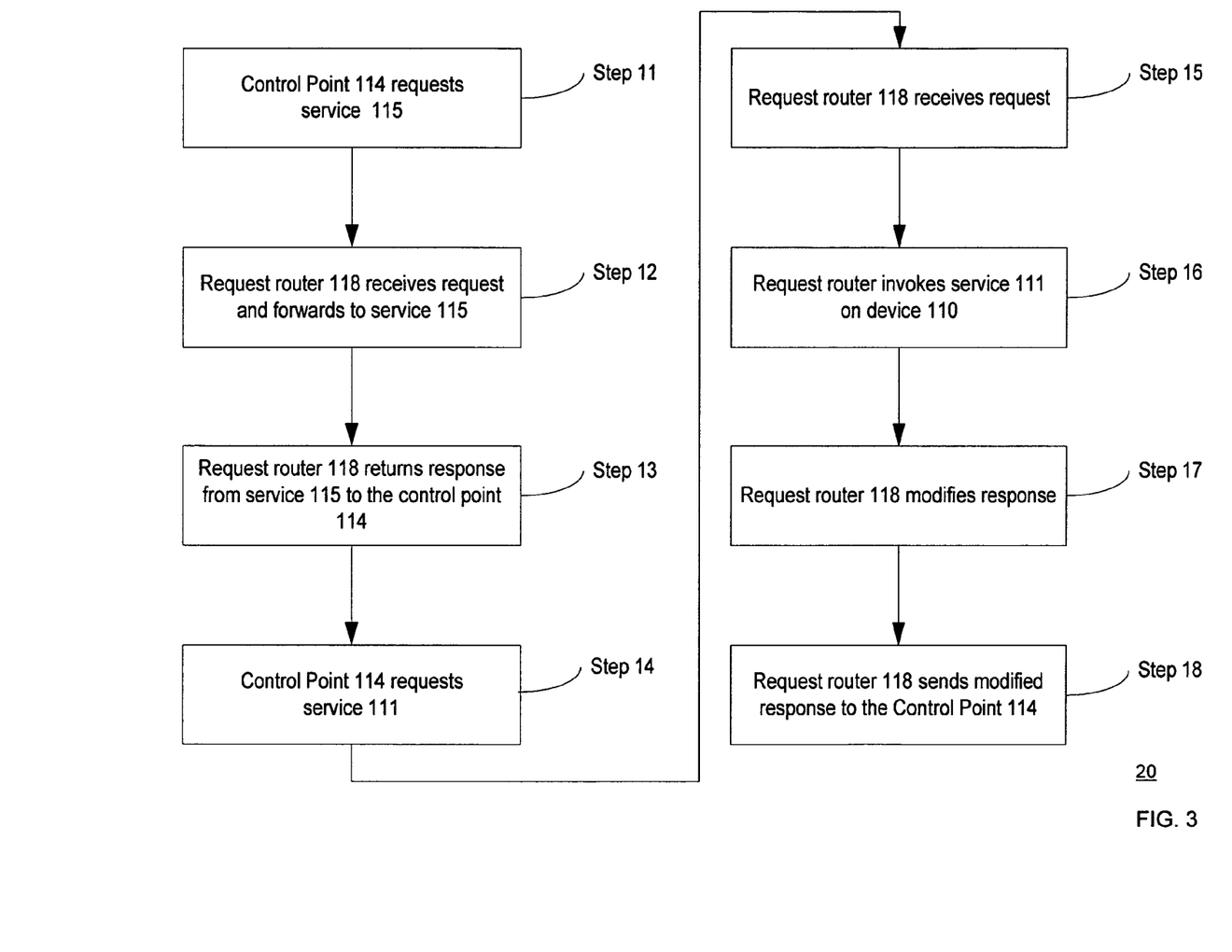
FIG. 3 shows a flowchart of the steps of an invocation phase of an example surrogating process, according to the present invention.

FIG. 3 shows the flowchart of the invocation phase 20, including the following steps:
11. After the discovery phase, the control point 114 issues a UPnP service request to the service 115.
12. The request router 118 receives the request. It examines the request and determines that it is intended for the service 115. The request router 118 then forwards the request to the service 115 for invocation.
13. The request router 118 receives a response from the service 115, wherein the request router 118 returns (passes) the response to the control point 114.
14. The control point 114 issues another UPnP service request to the surrogated service 111.

15. The request router 118 receives the request, and by examining the request determines that it is intended for the service 111.
16. The request router 118 invokes the service 111 on the device 110 and receives one or more service responses from the service 111.
17. The request router 118 examines each service response and changes an address (URL) in the service response to point to the request router 118 instead of the service 111.
18. The request router 118 then returns each modified response back to the control point 114.

During the steps 15-18 above, the service 115 functions as a surrogate for the service 111.

Figure 4:
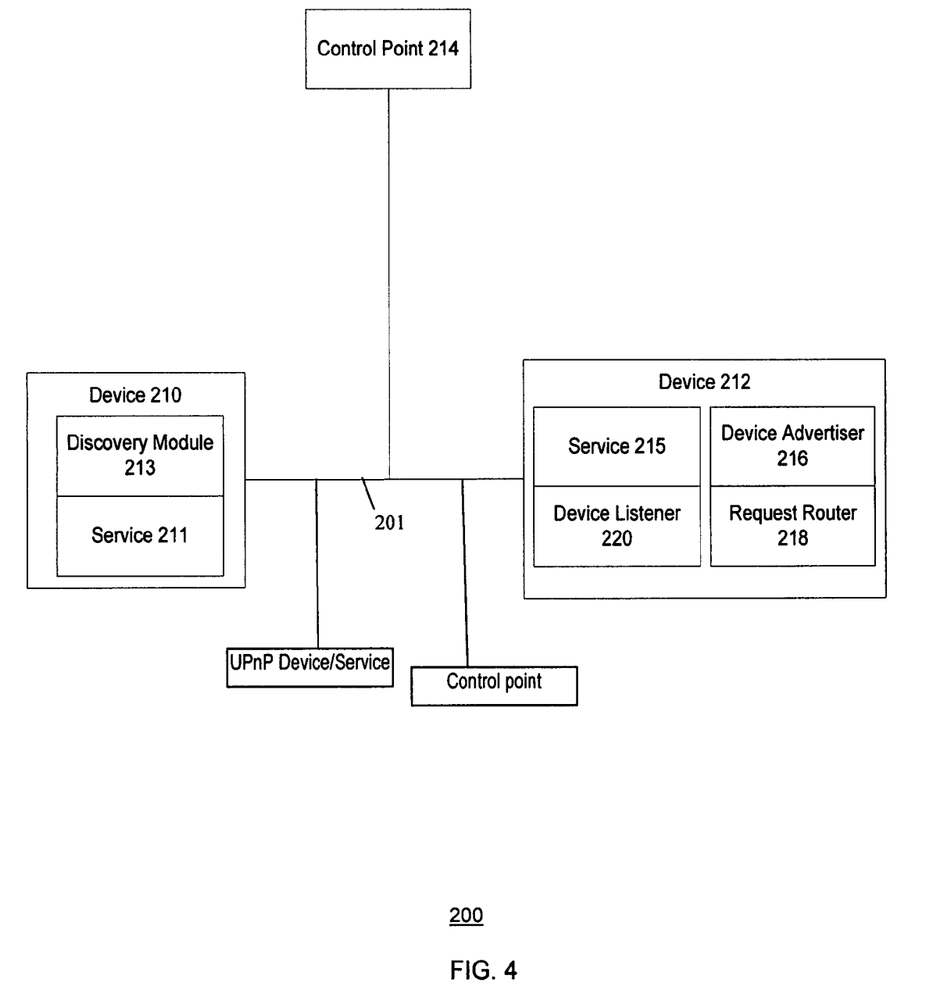
FIG. 4 shows a functional block diagram of another network implementing a surrogating process for resource access, according to another embodiment of the present invention.

A second implementation of the surrogating process according to the present invention enables a surrogating device to inform a surrogated device not to periodically advertise itself and its services and not to respond to the "M-Search" requests from the control points. FIG. 4 shows a functional block diagram of an example network 200 such as a local area network, as in a home network, that embodies said second implementation according to the present invention.

The network 200 includes at least one UPnP device 210, at least one surrogating device 212, and at least one UPnP control point 214. The devices 210, 212 and 214 are connected via a LAN 201, such as Ethernet, WiFi, etc. The UPnP device 210 includes a UPnP service 211 that can be invoked from the control point 214. In addition, the surrogated device 210 includes a discovery module 213 that is used to enable/disable (turn on/off) the SSDP functions of the device 210.

The surrogating device 212 includes a UPnP service 215. The service 215 is a new service that replaces (e.g., enhances) the functionalities of the services of the device 210. The surrogating device 212 also includes a device listener 220, a device advertiser 216 and a request router 218. The device listener 220 listens on the UPnP multicast channel over the LAN 201 for UPnP device/service advertisements and requests from UPnP control points. The device advertiser 216 advertises the presence of a new device/service on behalf of the UPnP device it surrogates. The request router 218 redirects service requests from the control point 214 to either the service 211 in the surrogated device 210 or the service 215 in the surrogating device 212, depending upon the request.

A surrogating process includes three phases: a setup phase, a discovery phase and an invocation phase.

The setup phase follows the setup phase of the first implementation described above, wherein the device 212 is configured to act as the surrogating device for the device 210 in order to add the new service 215, or update the service 211 to be the service 215. In addition the discovery module 213 is installed on the device 210.

Figure 5:
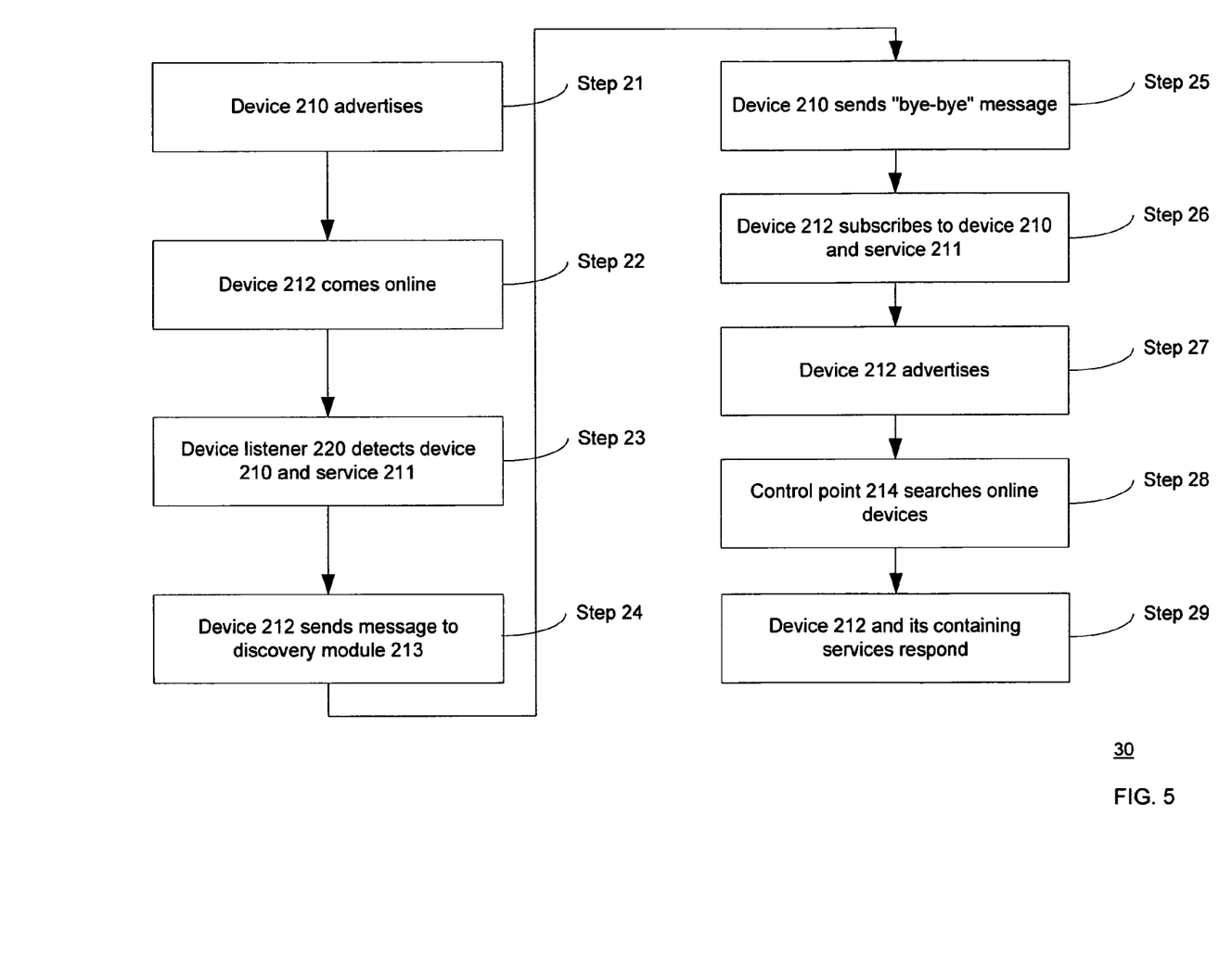
FIG. 5 shows a flowchart of the steps of a discovery phase of another example surrogating process, according to the present invention.

FIG. 5 shows a flowchart of the discovery phase 30 after a setup phase according to Case 1 above, wherein the discovery phase 30 includes the following steps:

21. If the setup phase is performed according to Case 1 above, the device 210 advertises itself and the service 211 on the multicast channel using UPnP SSDP, and proceeds to step 23 below. If the setup phase is performed according to the Case 2 above, the device 212 does not advertise on behalf of the device 210 and proceeds to step 22 below.
22. At a later time, the device 210 comes online and advertises its availability and the service 211 on the multicast channel over the LAN 201 using a UPnP SSDP message.
23. The device listener 220 detects the availability of the device 210 and service 211 by listening on the multicast channel over the LAN 201.
24. The device 212 sends an invocation message to the discovery module 213 to turn off the SSDP functions of the device 210.
25. The discovery module 213 receives the invocation message and multicasts a SSDP "bye-bye" message and the device 210 stops multicasting advertisements.
26. After the device 212 receives the "bye-bye" message, it sends a message to the discovery module 213 to subscribe to the device 210 and the service 211 such that the device 210 and the service 211 will send a unicast SSDP "alive" message (advertising their availability) to the device 212 periodically.
27. The device advertiser 216 starts to advertise the device 212, the surrogated service 211, and the service 215 by multicasting SSDP "alive" messages on the LAN 201. The surrogated service 211 is the same as the original service 211, but the URL of the surrogated service 211 points to the request router 218 in the surrogating device 212 instead of the surrogated device 210.
28. At a later time, the control point 214 comes online and multicasts a UPnP "M-Search" request on the LAN 201 to look for any online devices.
29. The device 212, the service 215, and the surrogated service 211 respond to the search request from the control point 214.

Figure 6:
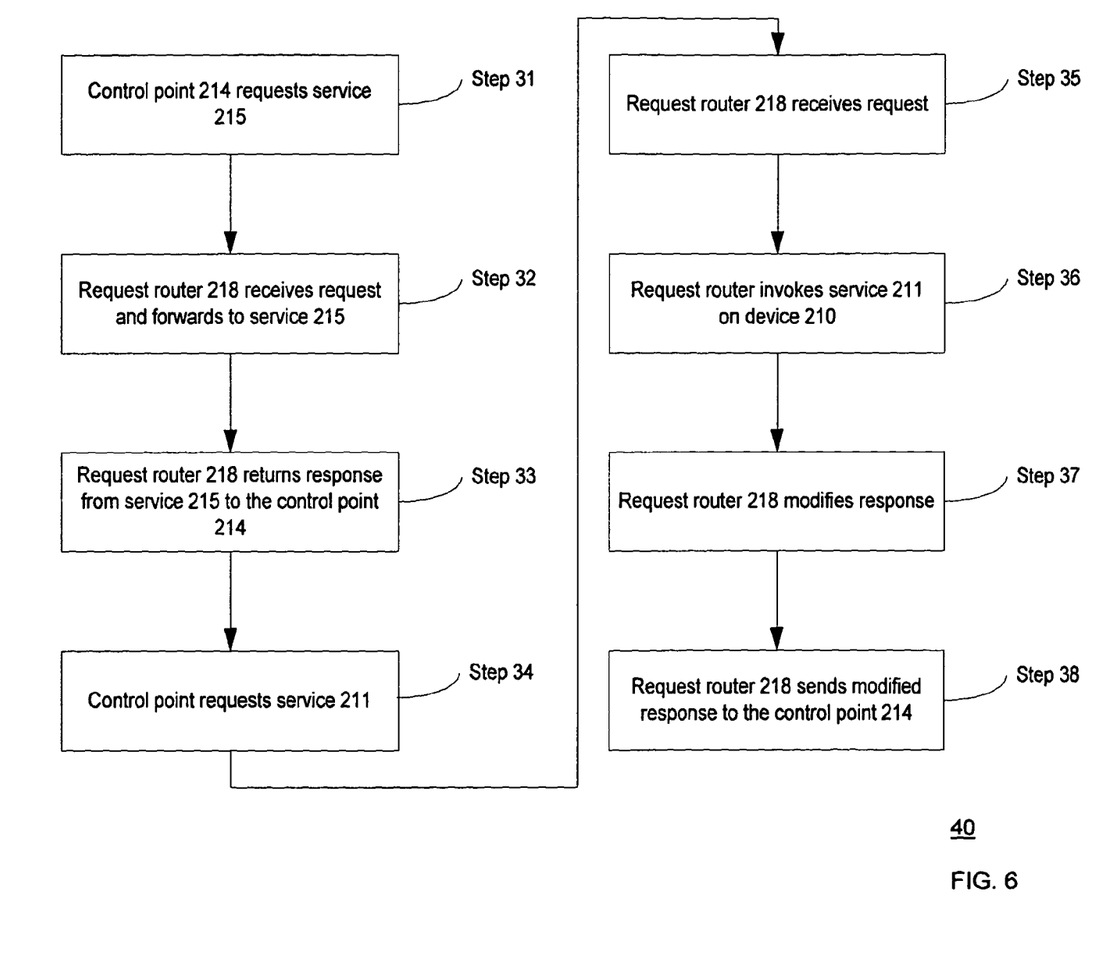
FIG. 6 shows a flowchart of the steps of an invocation phase of another example surrogating process, according to the present invention.

FIG. 6 shows the flowchart of the invocation phase 40, including the following steps:

31. After the discovery phase, the control point 214 issues a UPnP service request to the surrogating service 215.
32. The request router 218 receives the request and by examining the request determines that it is intended for the service 215. The request router 218 forwards the request to the service 215 for invocation.
33. The service 215 sends a response to the request router 218, and the request router 218 returns (passes) the response to the control point 214.
34. The control point 214 issues another UPnP request to the surrogated service 211.
35. The request router 218 receives the request, and by examining the request determines that it is intended for the service 211.
36. The request router 218 invokes the service 211 on the device 210, and receives one or more responses from the device 210.
37. The request router 218 examines each service response from the device 210 and changes all URLs in the service responses such that the URLs point to the request router 218 instead of the service 211 (replacement headers with REPLACE are unnecessary in this implementation).
38. The request router 218 returns the modified response back to the control point 214.

Figure 7:
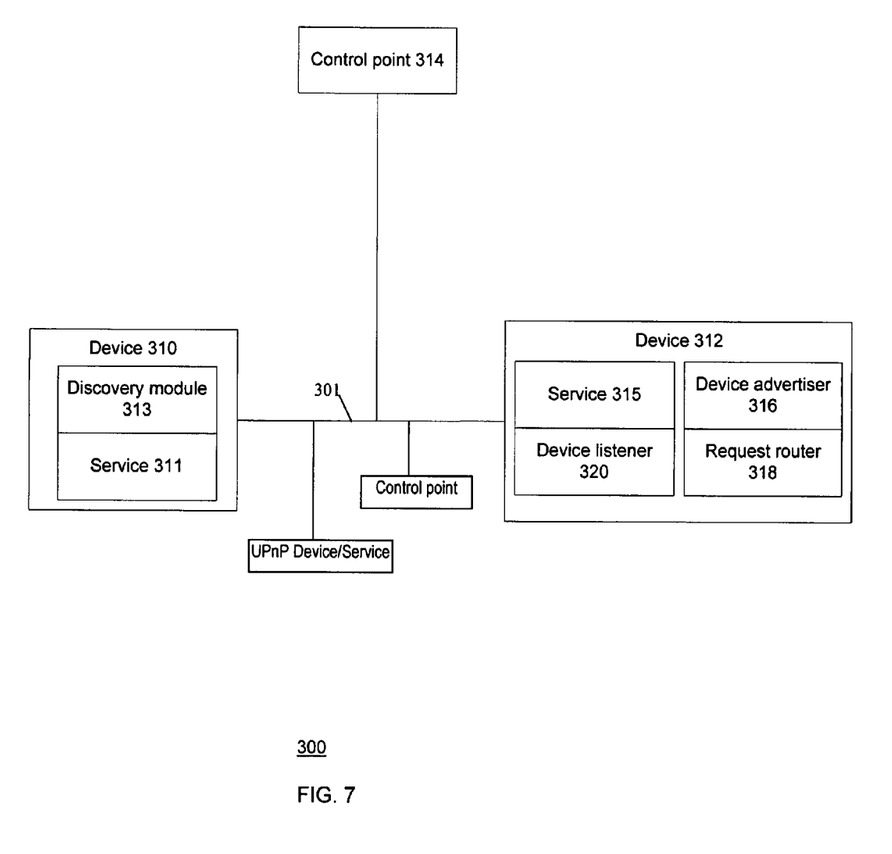
FIG. 7 shows a functional block diagram of another network implementing a surrogating process for resource access, according to another embodiment of the present invention.

A third implementation of the surrogating process according to the present invention enables a surrogated UPnP device to detect its surrogate (i.e., surrogating device) and by using a newly added SSDP header turn off its own SSDP advertisement function when a surrogate is available. FIG. 7 shows a functional block diagram of an example network 300 such as a local area network, as in a home network, that embodies said third implementation according to the present invention. The network 300 includes at least one UPnP device 310, at least one surrogating device 312, and at least one UPnP control point 314. The devices 310, 312 and 314 are connected via a LAN 301 such as Ethernet, WiFi, etc.

The surrogated UPnP device 310 includes a service 311 that can be invoked from the control point 314. In addition, the device 310 includes a discovery module 313 to turn on/off the SSDP functions of the device 310. The surrogating device 312 includes a UPnP service 315. The service 315 is a new service that enhances the functionalities of the services of the device 310. The surrogating device 312 further includes a device listener 320, a device advertiser 316 and a request router 318. The device listener 320 listens on the UPnP multicast channel over the LAN 301 for UPnP device/service advertisements and requests from UPnP control points. The device advertiser 316 advertises the presence of the new device/service on behalf of the device it surrogates. The request router 318 redirects service requests from the control point 314 to either the service 311 or the service 315 depending upon the request.

A surrogating process includes three phases: a setup phase, a discovery phase and an invocation phase.

The setup phase follows the setup phase of the first implementation described above, wherein the device 312 is configured to act as the surrogating device for the device 310 in order to add the new service 315, or update the service 311 to be the service 315. In addition, the discovery module 313 is installed on the device 310.

Figure 8:
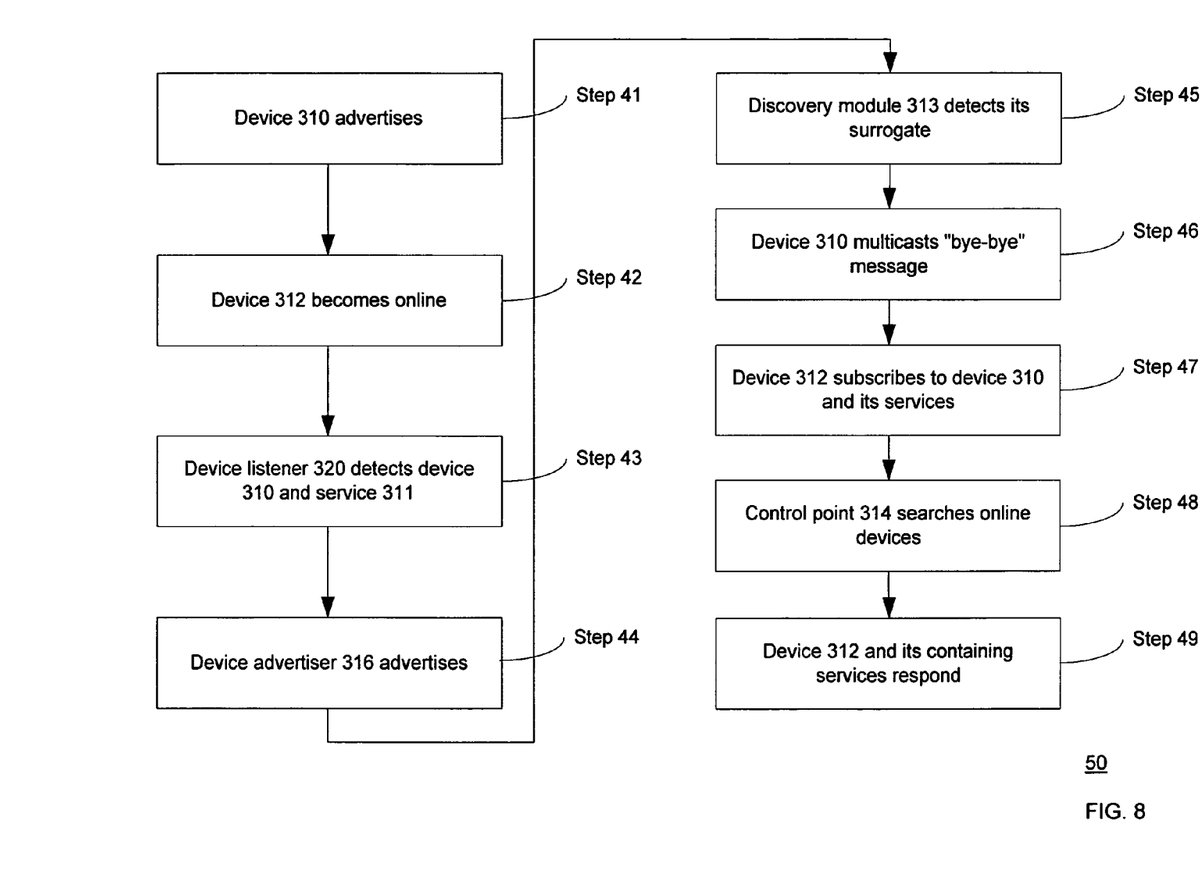
FIG. 8 shows a flowchart of the steps of a discovery phase of another example surrogating process, according to the present invention.

FIG. 8 shows a flowchart of the discovery phase 50 after a setup phase according to Case 1 above, wherein the discovery phase 50 includes the following steps:

41. If the setup phase is performed according to Case 1 above, the device 310 advertises itself and the service 311 on the multicast channel using UPnP SSDP, and proceeds to step 43 below. If the setup phase is performed according to Case 2 above, the device 312 does not advertise on behalf of the device 310 and proceeds to step 42 below.

42. At a later time, the device 310 comes online and advertises availability of itself and the service 311 on the multicast channel using UPnP SSDP.

43. The device listener 320 detects the availability of the device 310 and the service 311.

44. The device advertiser 316 starts to advertise the surrogating device 312, the surrogated service 311 and the service 315, UPnP using SSDP. The surrogated service 311 is the same as the original service 311, but the URL of the surrogated service 311 points to the request router 318 instead of the device 310.

a. In the advertisement for the device 312, the device advertiser 316 inserts a new header, "REPLACE", in the SSDP message. The value of this header is the UUID of the device 310. This informs any control point that the device 312 is a functional replacement of the device 310.

b. In the advertisement for the service 311, the device advertiser 316 inserts a new header, "REPLACE", in the SSDP message. The value of this header is in the form of "UUID:service type:service version". The "UUID" is the UUID of the device 310. The "service type" and the "service version" are the service type and the service version of the service 311, respectively. This informs any control point that the surrogating service 311 from the device 312 functionally replaces the surrogated service 311 from the device 310.

45. The discovery module 313 detects the availability of the device 312, the service 315 and the surrogated service 311 by listening on the multicast channel.

46. The discovery module 313, knowing its surrogating device 312 is online, multicasts a SSDP "bye-bye" message and stops advertising for itself.

47. After receiving the "bye-bye" message, the device 312 sends a message to the discovery module 313 to subscribe to the device 310 and the service 311 whereby the device 310 and the service 311 will send unicast "alive" messages to the device 312 periodically.

48. At a later time, the control point 314 comes online and multicasts a UPnP "M-Search" request to discover any online devices in the local network 301.

49. The device 312, the service 315 and the surrogated service 311 respond to the search request from the control point 314.

Figure 9:
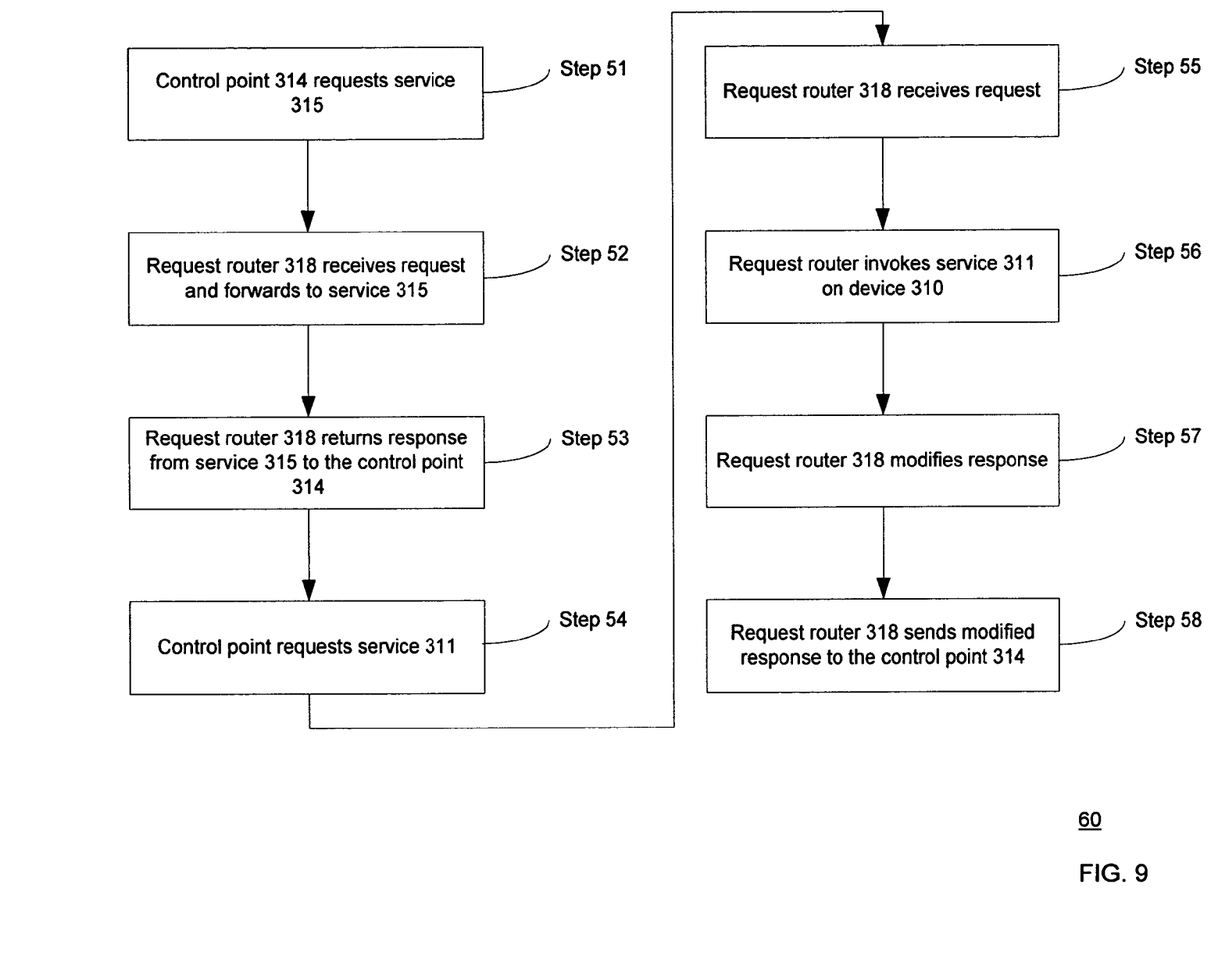
FIG. 9 shows a flowchart of the steps of an invocation phase of another example surrogating process, according to the present invention.

FIG. 9 shows the flowchart of the invocation phase 60, including the following steps:

51. After the discovery phase, the control point 314 issues a UPnP service request to the service 315.

52. The request router 318 receives the request, and by examining the request determines that it is intended for the service 315, and forwards it to the service 315.

53. The service 315 receives the request and sends a response to the request router 318 which returns the response to the control point 314.

54. The control point 314 issues another UPnP request to the surrogated service 311.

55. The request router 318 receives the request, and by examining the request determines that it is intended for the service 311.

56. The request router 318 invokes the service 311 on the device 310 and receives one or more service responses therefrom.

57. The request router 318 examines each service responses and changes all URLs in each service response such to point to the request router 318 instead of the service 311.

58. The request router 318 then returns the modified response back to the control point 314.

Therefore, according to the present invention, surrogates allow adding new services, replacing existing services with new services, reducing existing service functions and reverting service updates back to an earlier version, all without new hardware or firmware updates. The surrogates also allow proper operation in UPnP networks where devices that implement surrogates can coexist in the same network with UPnP devices that do not. Further, a device may have more than one surrogate and plural surrogates at the same time. Similarly, a device can be the surrogate for more than one device at different times or at the same time.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method for providing services in a network including a control point and plural Universal Plug and Play (UPnP) devices, comprising:

providing a surrogating UPnP device to function as a surrogate for a surrogated UPnP device providing a surrogated service;

configuring the surrogating device to provide a surrogating service for the surrogated service; and the surrogating device advertising the availability of itself, the surrogating service, the surrogated device and the surrogated service, for informing the control point that the surrogating device is a replacement for the surrogated device, and that the surrogating service is a replacement for the surrogated service, wherein the advertisement of the surrogated device by the surrogating device includes a replacement header identifying the surrogated device, for informing the control point that the surrogating device is a replacement for the surrogated device.

2. The method of claim 1 further comprising:
the surrogating device detecting the availability of the surrogated device and the availability of the surrogated service based on receiving the advertisement;
wherein the surrogating device advertising further includes:
the surrogating device advertising the availability of the surrogated service referring to the surrogating device;
wherein the advertisement of the surrogated service by the surrogating device includes a replacement header identifying the surrogated device, and the service type and version of the surrogated service, for informing the control point that the surrogating service provided by the surrogating device is a replacement for the surrogated service.

3. The method of claim 2 further comprising:
the control point multicasting a request to discover devices in the network; and
the surrogated device, the surrogated service, the surrogating device and the surrogating service, all responding to the search request, wherein the response from the surrogating service includes a replacement header that identifies the surrogated device and identifies the service type and version of the surrogated service, to inform the control point that the surrogating service provided by the surrogating device is a replacement for the surrogated service.

4. The method of claim 3 further comprising:
based on the replacement headers in one or more of the responses, the control point determining that the surrogating device functionally replaces the surrogated device, and the surrogating service functionally replaces the surrogated service, for service invocation.

5. The method of claim 4 further comprising:
the control point ignoring the responses and advertisements from the surrogated device and the surrogated service, and instead using the responses from the surrogating device and the surrogating service for service invocation.

6. The method of claim 2 further including:
the control point is operating in the network before the surrogating device and the surrogating service go online; and
the control point receiving and examining said advertisements in determining to ignore advertisements from the surrogated device and the surrogated service, and instead use the advertisements from the surrogating device and the surrogating service.

7. The method of claim 2 further comprising:
the control point discovering the devices in the network;
the control point issuing a first service request to the surrogating service;
the surrogating service sending a first response to the control point;
the control point issuing a second service request to the surrogated service;
the surrogated service sending a second response to the control point;
modifying the second response to refer to the surrogating device; and
sending each modified service response to the control point.

8. A method for providing services in a network including a control point and plural Universal Plug and Play (UPnP) devices, comprising:
providing a surrogating UPnP device to function as a surrogate for a surrogated UPnP device providing a surrogated service;
configuring the surrogating device to provide a surrogating service for the surrogated service; and
the surrogating device advertising the availability of itself, the surrogating service, and the surrogated device, for informing the control point that the surrogating device is a replacement for the surrogated device, and that the surrogating service is a replacement for the surrogated service;
the surrogating device detecting the availability of the surrogated device and the availability of the surrogated service based on receiving the advertisement;
the surrogating device signaling the surrogated device to cease advertising and cease responding to discovery requests from the control point; and
the surrogating device subscribing to the surrogated device and the surrogated service such that the surrogated device and the surrogated service begin periodically sending advertisement unicast messages to the surrogating device.

9. The method of claim 8 further comprising:
the surrogating device advertising the availability of the surrogated service referring to the surrogating device;
wherein the advertisement of the surrogated device by the surrogating device includes a replacement header identifying the surrogated device, for informing the control point that the surrogating device is a replacement for the surrogated device;
wherein the advertisement of the surrogated service by the surrogating device includes a replacement header identifying the surrogated device, the service type and version of the surrogated service, for informing the control point that the surrogating service provided by the surrogating device is a replacement for the surrogated service.

10. The method of claim 9 further comprising:
based on the replacement headers in one or more of the responses, the control point determining that the surrogating device functionally replaces the surrogated device, and the surrogating service functionally replaces the surrogated service, for service invocation.

11. The method of claim 8 further comprising:
the control point discovering the devices in the network;
the control point issuing a first service request to the surrogating service;
the surrogating service sending a first response to the control point;
the control point issuing a second service request to the surrogated service;
the surrogated service sending a second response to the control point;
modifying the second response to refer to the surrogating device; and
sending each modified service response to the control point.

12. A method for providing services in a network including a control point and plural Universal Plug and Play (UPnP) devices, comprising:
providing a surrogating UPnP device to function as a surrogate for a surrogated UPnP device providing a surrogated service;

configuring the surrogating device for advertising the availability of itself and the surrogated service;

the surrogating device advertising the availability of itself, the surrogating service, the surrogated device and the surrogated service, for informing the control point that the surrogating device is a replacement for the surrogated device, and the advertisement for the surrogating service informs the control point that the surrogating service is a replacement for the surrogated service;

the surrogated device detecting its surrogating devices and if a surrogating device is detected, then the surrogated device ceasing advertising itself, wherein the advertisement of the surrogated service by the surrogating device includes a replacement header identifying the surrogated device, the service type and version of the surrogated service, for informing the control point that the surrogating service provided by the surrogating device is a replacement for the surrogated service.

13. The method of claim 12 further comprising:

the surrogating device detecting the availability of the surrogated device and the availability of the surrogated service based on receiving the advertisement;

wherein the surrogating device advertising, further includes:

the surrogating device advertising the availability of the surrogated service referring to the surrogating device;

wherein the advertisement of the surrogated device by the surrogating device includes a replacement header identifying the surrogated device, for informing the control point that the surrogating device is a replacement for the surrogated device.

14. The method of claim 13 further comprising:

the control point multicasting a request to discover devices in the network; and the surrogated device, the surrogated service, the surrogating device and the surrogating service, all responding to the search request, wherein the response from the surrogating service includes a replacement header that identifies the surrogated device and identifies the service type and version of the surrogated service, to inform the control point that the surrogating service provided by the surrogating device is a replacement for the surrogated service.

15. The method of claim 14 further comprising:

based on the replacement headers in one or more of the responses, the control point determining that the surrogating device functionally replaces the surrogated device, and the surrogating service functionally replaces the surrogated service, for service invocation.

16. The method of claim 15 further comprising:

the control point ignoring the responses and advertisements from the surrogated device and the surrogated service, and instead using the responses from the surrogating device and the surrogating service for service invocation.

17. The method of claim 14 further including:

the control point is operating in the network before the surrogating device and the surrogating service go online; and the control point receiving and examining said advertisements in determining to ignore advertisements from the surrogated device and the surrogated service, and instead use the advertisements from the surrogating device and the surrogating service.

18. The method of claim 14 further comprising:

the control point discovering the devices in the network;

the control point issuing a first service request to the surrogating service;

the surrogating service sending a first response to the control point;

the control point issuing a second service request to the surrogated service;

the surrogated service sending a second response to the control point;

modifying the second response to refer to the surrogating device; and sending each modified service response to the control point.

19. An apparatus for providing services in a network including a control point and plural Universal Plug and Play (UPnP) devices, comprising:

a surrogating UPnP device configured to function as a surrogate for a surrogated UPnP device providing a surrogated service;

wherein the surrogating device is further configured to provide a surrogating service for the surrogated service; and the surrogating device including an advertiser configured for advertising the availability of itself, the surrogating service, the surrogated device and the surrogated service, for informing the control point that the surrogating device is a replacement for the surrogated device, and that the surrogating service is a replacement for the surrogated service, wherein the advertisement of the surrogated device by the surrogating device includes a replacement header identifying the surrogated device, for informing the control point that the surrogating device is a replacement for the surrogated device.

20. The apparatus of claim 19 wherein:

the advertiser is further configured for advertising the availability of itself and the surrogated service; and the surrogating device further including a listener configured for detecting the availability of the surrogated device and the availability of the surrogated service based on receiving the advertisement.

21. The apparatus of claim 20 wherein the advertiser is further configured for advertising the availability of the surrogated service referring to the surrogating device, wherein:

the advertisement of the surrogated service by the surrogating device includes a replacement header identifying the surrogated device, and the service type and version of the surrogated service, for informing the control point that the surrogating service provided by the surrogating device is a replacement for the surrogated service.

22. The apparatus of claim 21 wherein:

the control point multicasts a request to discover devices in the network; and the surrogated device, the surrogated service, the surrogating device and the surrogating service, are configured for responding to the search request, wherein the response from the surrogating service includes a replacement header that identifies the surrogated device and identifies the service type and version of the surrogated service, to inform the control point that the surrogating service provided by the surrogating device is a replacement for the surrogated service.

23. The apparatus of claim 22 wherein:

based on the replacement headers in one or more of the responses, the control point determines that the surrogating device functionally replaces the surrogated device, and the surrogating service functionally replaces the surrogated service, for service invocation.

24. The apparatus of claim 23 wherein:
the control point ignores the responses and advertisements from the surrogated device and the surrogated service, and instead uses the responses from the surrogating device and the surrogating service for service invocation.

25. The apparatus of claim 21 wherein:
the control point operates in the network before the surrogating device and the surrogating service go online; and
the control point receives and examines said advertisements in determining to ignore advertisements from the surrogated device and the surrogated service, and instead uses the advertisements from the surrogating device and the surrogating service.

26. The apparatus of claim 21 wherein:
the control point discovers the devices in the network;
the control point issues a first service request to the surrogating service;
the surrogating service is further configured for sending a first response to the control point;
the control point issues a second service request to the surrogated service; and
the surrogated service is further configured for sending a second response to the control point, modifying the second response to refer to the surrogating device, and sending each modified service response to the control point.

27. An apparatus for providing services in a network including a control point and plural Universal Plug and Play (UPnP) devices, comprising:
a surrogating UPnP device configured to function as a surrogate for a surrogated UPnP device providing a surrogated service;
the surrogating device further configured to provide a surrogating service for the surrogated service;
the surrogating device including an advertiser configured for advertising the availability of itself, the surrogating service, and the surrogated device, for informing the control point that the surrogating device is a replacement for the surrogated device, and that the surrogating service is a replacement for the surrogated service; and
the surrogating device is further configured for informing a surrogated device to cease advertising of itself and its services,
wherein the surrogating device subscribes to the surrogated device and the surrogated service such that the surrogated device and the surrogated service begin periodically sending advertisement unicast messages to the surrogating device.

28. The apparatus of claim 27 wherein:
the surrogating device further includes a listener configured for detecting the availability of the surrogated device and the availability of the surrogated service based on receiving the advertisement;
the surrogating device is further configured for signaling the surrogated device to cease advertising and cease responding to discovery requests from the control point.

29. The apparatus of claim 28 wherein:
the advertiser is further configured for advertising the availability of the surrogated service referring to the surrogating device;
the advertisement of the surrogated device by the advertiser includes a replacement header identifying the surrogated device, for informing the control point that the surrogating device is a replacement for the surrogated device; and the advertisement of the surrogated service by the advertiser includes a replacement header identifying the surrogated device, the service type and version of the surrogated service, for informing the control point that the surrogating service provided by the surrogating device is a replacement for the surrogated service.

30. The apparatus of claim 29 wherein:
based on the replacement headers in one or more of the responses, the control point determining that the surrogating device functionally replaces the surrogated device, and that the surrogating service functionally replaces the surrogated service, for service invocation.

31. The apparatus of claim 28 wherein:
the control point discovers the devices in the network;
the control point issues a first service request to the surrogating service;
the surrogating service is further configured for sending a first response to the control point;
the control point issues a second service request to the surrogated service;
the surrogated service is further configured for sending a second response to the control point, modifying the second response to refer to the surrogating device, and sending each modified service response to the control point.

32. A system for providing services in a network including a control point and plural Universal Plug and Play (UPnP) devices, comprising:
a surrogated UPnP device;
a surrogating UPnP device configured to function as a surrogate for a surrogated UPnP device providing a surrogated service;
the surrogating device further configured for advertising the availability of itself and the surrogated service;
the surrogating device including an advertiser configured for advertising the availability of itself, the surrogating service, the surrogated device and the surrogated service, for informing the control point that the surrogating device is a replacement for the surrogated device, and the advertisement for the surrogating service informs the control point that the surrogating service is a replacement for the surrogated service; and
the surrogated device including a listener configured for detecting its surrogating devices and if a surrogating device is detected, then the surrogated device ceases advertising itself,
wherein the advertisement of the surrogated device by the surrogating device includes a replacement header identifying the surrogated device, for informing the control point that the surrogating device is a replacement for the surrogated device.

33. The system of claim 32 wherein:
the advertiser is further configured for advertising the availability of itself and the surrogated service; and
the surrogating device includes a listener configured for detecting the availability of the surrogated device and the availability of the surrogated service based on receiving the advertisement.

34. The system of claim 33 wherein the advertiser is further configured for advertising the availability of the surrogated service referring to the surrogating device, wherein:
the advertisement of the surrogated service by the surrogating device includes a replacement header identifying the surrogated device, the service type and version of the surrogated service, for informing the control point that the surrogating service provided by the surrogating device is a replacement for the surrogated service.

35. The system of claim 34 wherein:

the control point multicasts a request to discover devices in the network;

the surrogated device, the surrogated service, the surrogating device and the surrogating service, are configured for responding to the search request, wherein the response from the surrogating service includes a replacement header that identifies the surrogated device and identifies the service type and version of the surrogated service, to inform the control point that the surrogating service provided by the surrogating device is a replacement for the surrogated service.

36. The system of claim 35 further comprising:

based on the replacement headers in one or more of the responses, the control point determining that the surrogating device functionally replaces the surrogated device, and the surrogating service functionally replaces the surrogated service, for service invocation.

37. The system of claim 36 wherein:

the control point ignores the responses and advertisements from the surrogated device and the surrogated service, and instead uses the responses from the surrogating device and the surrogating service for service invocation.

38. The system of claim 35 wherein:

the control point is operating in the network before the surrogating device and the surrogating service go online; and the control point receives and examines said advertisements in determining to ignore advertisements from the surrogated device and the surrogated service, and instead uses the advertisements from the surrogating device and the surrogating service.

39. The system of claim 35 wherein:

the control point discovers the devices in the network;

the control point issues a first service request to the surrogating service;

the surrogating service is further configured for sending a first response to the control point;

the control point issues a second service request to the surrogated service; and the surrogated service is further configured for sending a second response to the control point, modifying the second response to refer to the surrogating device, and sending each modified service response to the control point.

\* \* \* \* \*